United States Patent [19]
Pizzorno

[11] Patent Number: 5,393,480
[45] Date of Patent: Feb. 28, 1995

[54] CONTROL DEVICE FOR VULCANIZATION CHAMBERS IN VULCANIZATION PRESSES AND PROCESS PUT INTO PRACTICE BY SAID CONTROL DEVICE

[75] Inventor: Augusto Pizzorno, Milan, Italy

[73] Assignee: Pirelli Coordinamento Pneumatici S.P.A., Milan, Italy

[21] Appl. No.: 934,392

[22] Filed: Aug. 25, 1992

[30] Foreign Application Priority Data

Aug. 30, 1991 [IT] Italy ............... MI91A 002323

[51] Int. Cl.⁶ ............................................. B29D 30/06
[52] U.S. Cl. ................................. 264/315; 264/326; 425/29; 425/33; 425/48; 425/58
[58] Field of Search .............. 264/40.5, 40.7, 315, 264/326; 425/33, 38, 48, 150, 39, 58, 29, 36

[56] References Cited

U.S. PATENT DOCUMENTS

| | | |
|---|---|---|
| 2,559,119 | 7/1951 | Frank . |
| 3,487,507 | 1/1970 | Turk ........................ 425/29 |
| 3,597,797 | 8/1971 | Delille ....................... 425/36 |
| 3,659,973 | 5/1972 | Yoshida et al. ............ 425/29 |
| 4,527,946 | 7/1985 | Singh et al. ............... 425/33 |
| 4,597,729 | 7/1986 | Singh et al. ............... 425/33 |
| 4,684,338 | 8/1987 | Steidl et al. . |
| 4,695,234 | 9/1987 | Amano et al. . |
| 4,695,235 | 9/1987 | Ichikawa et al. . |
| 4,768,937 | 9/1988 | Singh ....................... 425/38 |
| 4,872,822 | 10/1989 | Pizzorno . |
| 5,106,280 | 4/1992 | Sakaguchi ................ 425/38 |

FOREIGN PATENT DOCUMENTS

| | | |
|---|---|---|
| 0199064 | 10/1986 | European Pat. Off. . |
| 0270022 | 6/1988 | European Pat. Off. . |
| 843679 | 8/1960 | United Kingdom . |

*Primary Examiner*—Mathieu D. Vargot
*Attorney, Agent, or Firm*—Stevens, Davis, Miller & Mosher

[57] ABSTRACT

In a vulcanization press of the B.O.M. type, a vulcanization chamber has respective end edges (5a, 5b) connected to a disc (6) movable upon command of an actuator (8) and a disc (9) which is fixed relative to said actuator. The movable disc is fastened to a grasping head (17) provided with quick release pins (20), integral with the end of a drive rod (7) operable by a lower piston (11) contained in the actuator. The fixed disc is engaged by radially retractable latches (29) to a grasping ring (28) fastened to the actuator. The raising of the movable disc is stopped due to the chamber tensioning. The disc descent is stopped by two semi-cylindrical elements (12a, 12b) movable close to the drive rod, acting in abutment on an upper piston (15) contained in the actuator.

9 Claims, 3 Drawing Sheets

CONTROL DEVICE FOR VULCANIZATION CHAMBERS IN VULCANIZATION PRESSES AND PROCESS PUT INTO PRACTICE BY SAID CONTROL DEVICE

BACKGROUND OF THE INVENTION

The present invention relates to a control device for vulcanization chambers in vulcanization presses, said device being of the type comprising: a fluid-operated actuator housed in a vulcanization press bed; a drive rod coaxially emerging from the fluid-operated actuator and movable, upon operation of a lower piston operatively housed in the actuator, from a minimally drawn-out position to a maximally drawn-out position relative to the actuator itself. The device includes a movable sealing disc, coaxially fastened to the drive rod; a fixed sealing disc, coaxially fixed relative to the fluid-operated actuator; a flexible substantially sleeve-shaped vulcanization chamber on an upper end edge and a lower end edge which is sealingly fastened to said movable disc and fixed disc respectively; first stop means to fix the positioning of the drive rod to the maximally drawn-out position; and second stop means to fix the positioning of the drive rod to the minimally drawn-out position.

This device puts into practice a control process for vulcanization chambers in vulcanization presses of the type involving the use of a substantially sleeve-shaped vulcanization chamber having an upper end edge engaged to a sealing disc axially movable upon command of a fluid-operated actuator fastened to a vulcanization press bed, and a lower end edge engaged to a sealing disc which is fixed relative to said fluid-operated actuator. The disclosed process includes the steps of: moving the movable disc apart from the fixed disc upon a thrust action exerted by said fluid-operated actuator, so as to extend the vulcanization chamber according to a substantially cylindrical conformation; moving the movable disc close to the fixed disc and simultaneously introducing working fluid into the vulcanization chamber, in order to cause the chamber to radially expand within a mold associated with said press.

It is known that in vulcanization presses of the so-called "B.O.M." (Bag-O-Matic) type, used in tire vulcanization, the use of a vulcanization chamber made of elastomeric material is provided, which is substantially in the form of a sleeve and which lends itself to being brought from an extended condition, in which it vertically projects in a cylindrical conformation from the lower portion of the mold, to enable the removal of the vulcanized tire and the introduction into the same mold of a new tire to be vulcanized, to a radially-expanded condition in which the chamber, inflated under pressure, acts against the inner walls of the tire being made in order to ensure the adhering thereof against the inner sides of the mold encircling it.

In particular, the vulcanization chamber has an upper end edge sealingly fastened to a movable disc, rigidly connected to a drive rod. This drive rod is operable by a lower piston being part of a fluid-operated actuator fixedly housed in the press bed.

The vulcanization chamber also has a lower end edge which is sealingly engaged to a fixed disc coaxially screwed to the upper end of the actuator, from which the drive rod emerges. This fixed disc is disposed substantially flush with the lower portion of the mold.

By introducing working fluid, generally water or steam under pressure, into the fluid-operated actuator, the drive rod is axially moved by the lower piston, between a maximally drawn-out position to a minimally drawn-out position relative to the actuator itself. Corresponding to these positions is the extended and radially-expanded conditions respectively of the vulcanization chamber.

Also housed in the fluid-operated actuator is an upper piston, the essential function of which is to define the stop positions of the drive rod, and therefore the movable disc, at said maximally and minimally drawn-out locations.

To this end, the upper piston carries one cylindrical spacer designed to act in abutment against the upper end of the actuator in order to give the piston itself a predetermined positioning, capable of suitably restraining the upstroke of the lower piston. Usually the upstroke is limited to such an extent that in the maximally drawn-out position of the rod, the chamber is extended and in tension so as to enable the vulcanized tire to be discharged and a new raw carcass ready for vulcanization to be charged.

The spacer performs the function of limiting the chamber elongation and the consequent pulling effort applied thereto within safety values; it will be apparent that in the absence of this spacer the vulcanization chamber, under the thrust exerted by the upper piston (due to the high feed pressure of the working fluid in the actuator, generally not lower than 1.8 MPa) would undergo elongations and would be subjected to too high efforts that would impair the life of the chamber.

Also associated with the upper piston is a second spacer of cylindrical tubular configuration, disposed coaxially with the first spacer and internally thereof. The second spacer is slidably passed through by the drive rod and emerges from the fluid-operated actuator, at the upper part thereof, in order to stop the downward motion of the movable disc and thereby define the axial positioning of the same in the minimally drawn-out position of the rod.

In current presses of the B.O.M. type there is also provision for the positioning of the movable disc to be fixed at different locations (within a limited range) along the end portion of the drive rod, depending upon the spacer size and the extension of the associated chamber, in order to achieve the expected chamber elongation and/or for other reasons.

The foregoing being stated, it is noted that presently presses of the B.O.M. type involve long idle times when it is necessary to carry out the replacement of the vulcanization chamber. It is in fact necessary to wait for the press cooling taking place before an operator may then be able to disassemble the fixed and movable discs in order to remove the existing chamber, dismantle the actuator so as to replace the spacers by other spacers suitable for the new chamber to be installed and then reassemble the actuator and discs to the new chamber.

In addition, it is also necessary to wait for the press again to reach the working temperature before the vulcanization cycle of the tires can be restarted.

The Applicant has already developed and put into practice a quick coupling device enabling the immediate removal of the discs together with the chamber in order to carry out the quick replacement of said chamber, also in an automatic manner, without waiting times being necessary for the press cooling and subsequent heating.

In this device (see U.S. Pat. No. 4,872,822) provision is substantially made for a grasping head to be mounted to the upper end of the drive rod, inside which head a plurality of circumferentially distributed pins is housed, said pins being operable from the outside of the head so as to be brought from an engaging position in which they radially project from respective openings exhibited by the head to a disengaging condition in which they are radially retracted within the head. In the engaging position the pins lend themselves to hold the disc associated with the rod by entering a circumferential groove formed on an internal cylindrical surface of the disc, whereas in the disengaged position the disc is clear of the pins and can therefore be removed from the head.

In accordance with the above device the lower disc is also provided to be detachably fastened to a grasping ring provided with a plurality of circumferentially distributed latches that are radially movable, upon angular rotation of a drive nut provided with circumferential cams, between an engaged position in which they radially project towards the inside of the ring to a disengaged position in which they are radially retracted in spaced apart relation with respect to the ring axis. In the engaged position the latches penetrate into a circumferential groove formed on an outer cylindrical surface of the disc in order to firmly hold said disc, whereas in the disengaged position disc removal is allowed.

However the above described device lends itself to be used only on presses of recent vintage, in which both discs are axially movable independently of each other and in which the replacement of the vulcanization chamber does not involve a long additional time for the replacement of spacers or the like within the actuator controlling the disc shifting.

In accordance with the present invention it has been found that in order to enable the use of a quick coupling device on a press of the B.O.M. type the positioning of the movable disc must be suitably fixed in the vicinity of the upper end of the drive rod, and the stopping of the rod upstroke to the maximally drawn-out position must be determined by the tensile strength opposed by the chamber in an extended condition, to the thrust exerted by the actuator.

SUMMARY OF THE INVENTION

In particular, the invention relates to a control device for vulcanization chambers in vulcanization presses, characterized in that it comprises a grasping head fastened to an upper end of the drive rod and carrying first quick coupling means for detachably engaging the movable disc to the rod and a grasping ring fastened to said fluid-operated actuator and carrying second quick coupling means for detachably engaging said fixed disc. The first stop means substantially consists of said vulcanization chamber, the latter reacting to tensile stress between the lower and upper sealing discs in order to stop the movement of the drive rod to the maximally drawn-out position and that said second stop means consists of at least two semi-cylindrical elements to be moved close to the drive rod at opposite positions thereof, so as to define a tubular locating sleeve slidably passed through by the drive rod, said locating sleeve having a lower end arranged to act in abutment on a locating seat carried by the fluid-operated actuator and an upper end arranged to offer an abutment seat for stopping the drive rod downstroke to the minimally drawn-out position.

In particular the first quick coupling means comprises: a cylindrical collar coaxially fastened to the movable disc and designed to be engaged to said grasping head; a plurality of pins oscillatably received in respective circumferentially-distributed housings in the grasping head and simultaneously oscillating between an engaged position in which they radially project from respective openings exhibited by the grasping head for holding the movable disc at an annular groove formed within said collar, and a disengaged position in which they are radially retracted within the head so as to enable the free movement of said movable disc; a drive bush coaxially movable within the grasping head between a retaining position in which it acts on the pins to keep them to the engaged position, and a release position in which it frees said pins in order to enable the movement thereof to the disengaged position.

Preferably, the drive bush is axially movable from the retaining position to the release position against the action of a return spring by effect of a thrust element to be inserted in an access opening in the grasping head at the upper part thereof.

Still in accordance with the present invention the grasping ring is fastened to the fluid-operated actuator by a threaded coupling, and the second quick coupling means comprises: a plurality of latches housed in respective slide openings circumferentially distributed in the grasping ring, said latches being simultaneously movable between an engaged position, in which they radially project from said slide openings to the outside of the grasping ring for engagement of the fixed disc at an annular groove formed on an inner cylindrical surface thereof and a disengaged position in which they are radially retracted towards the inside of the ring for releasing the fixed disc. A drive nut is rotatably housed in an annular recess formed coaxially in the grasping ring and carrying, on an outer peripheral edge thereof, a plurality of circumferential cams, each of them being associated with one of said latches, said drive nut being angularly rotatable between a retaining position in which said cams keep the latches in the engaged position and a release position in which the cams disengage the respective latches in order to enable the free movement thereof to the disengaged position.

It is also provided that said locating seat be formed on an upper piston slidably housed in the fluid-operated actuator and slidably passed through by said drive rod, and that each of said semi-cylindrical elements be provided, in the vicinity of the upper end thereof, with at least a radial retaining relief arranged to act in abutment on the upper end of the fluid-operated actuator for stopping the locating sleeve from sliding towards the inside of said actuator when the upper piston moves away from the upper end of the latter.

Advantageously, said fluid-operated actuator is fed with working fluid under a pressure between 0.4 and 1.2 MPa.

It is a further object of the present invention to utilize a control process for vulcanization chambers in vulcanization presses, characterized in that it further comprises a longitudinal tensioning step applied to the vulcanization chamber in order to stop the shifting of the movable disc away from the fixed disc, counteracting the thrust transmitted to the movable disc by said fluid-operated actuator.

BRIEF DESCRIPTION OF THE DRAWINGS

Further features and advantages of the invention will become more apparent from the detailed description of a preferred embodiment of a control device for vulcanization chambers in vulcanization presses and a control process put into practice by said device, in accordance with the present invention, given hereinafter by way of non-limiting example with reference to the accompanying drawings, in which.

DETAILED DESCRIPTION OF A PREFERRED EMBODIMENT

Figure 1:
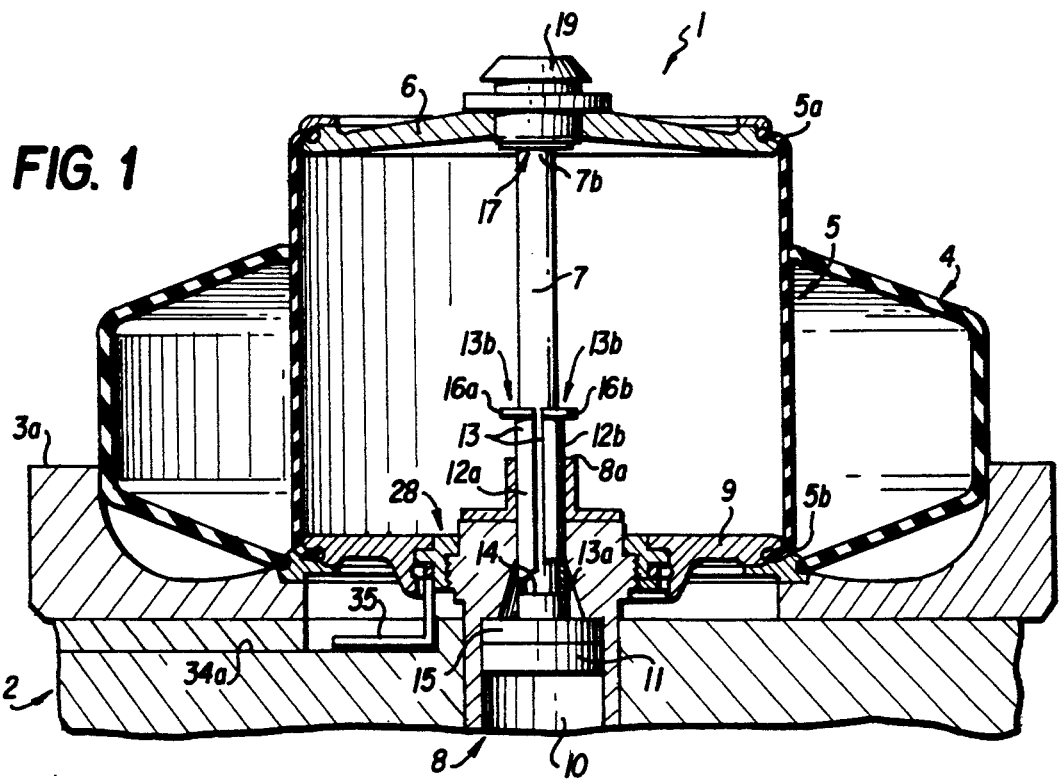
FIG. 1 is a fragmentary diametrical sectional view of the device in question installed on a vulcanization press of the B.O.M. type, the vulcanization chamber of which is in its maximum-extension condition.

Referring to the drawings, a control device for vulcanization chambers in vulcanization presses in accordance with the present invention has been generally identified by reference numeral 1.

The device 1 is associated with a press of the so-called "B.O.M." type comprising, as well-known to those skilled in the art, a bed 2 on which a mold 3 suitable for tire vulcanization is operatively mounted; said mold in the embodiment shown consists of a lower half-portion 3a and an upper half-portion 3b (not shown in FIG. 1) adapted to be moved close to each other so as to enclose a tire 4 which was previously disposed on the lower half-portion 3a.

Figure 2:
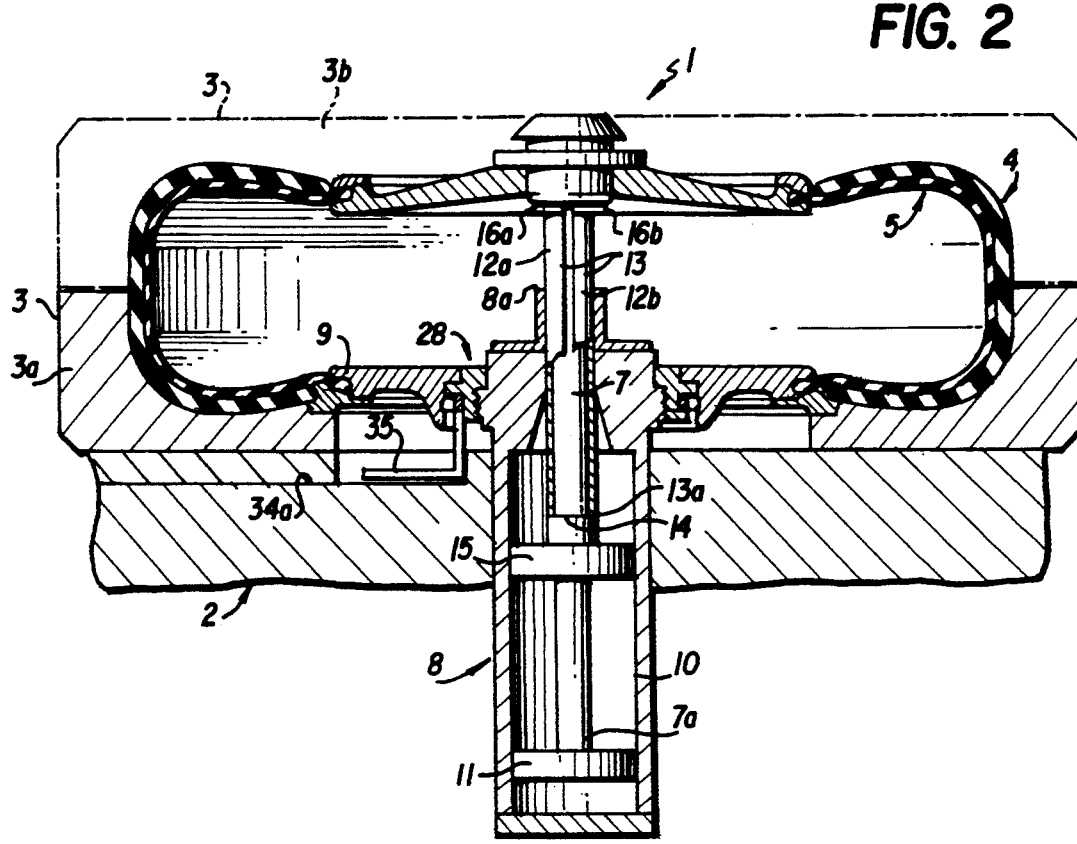
FIG. 2 is a fragmentary diametrical sectional view showing the device with the vulcanization chamber in an expanded condition, during the vulcanization of a tire in the press.

Acting within the mold 3 is a vulcanization chamber 5 made of elastomeric material and having a substantially tubular structure, said chamber lending itself to be brought from an extended condition in which, as shown in FIG. 1, it stands upright from the middle of the lower half-portion 3a according to a cylindrical configuration, to a radially expanded condition in which, as shown in FIG. 2, it is inflated with steam under pressure within the tire 4 closed in the mold 3.

In greater detail, the vulcanization chamber 5 has an upper end edge 5a sealingly fastened in a known manner to a movable disc 6 coaxially fastened to a drive rod 7 operable by axial movement upon command of a fluid-operated actuator generally identified by 8.

The vulcanization chamber 5 also has a lower end edge 5b sealingly engaged to a fixed disc 9, rigidly connected to the upper end of the actuator 8 coaxially facing the inside of the lower mold half 3.

In a known manner, actuator 8 essentially comprises a cylinder 10 within which a lower piston 11 integral with a lower end 7a of the drive rod 7 is sealingly and slidably housed. Following the admission of working fluid under pressure into the cylinder 10, the drive rod 7 is axially moved, upon command of the lower piston 11, from a maximally drawn-out position relative to the actuator 8 to which the extension of chamber 5 as shown in FIG. 1 corresponds, to a minimally drawn-out position relative to said actuator, to which the radial expansion of the chamber corresponds (see FIG. 2).

The device 1 further comprises first and second stop means arranged to fix the drive rod positioning to the maximally drawn-out and minimally drawn-out positions relative to actuator 8.

According to the invention, the first stop means substantially consists of the vulcanization chamber 5 itself which lends itself to be stretched taut and to consequently react to tensile stress between the fixed 9 and movable 6 sealing discs in order to stop the drive rod 7 movement in its maximally drawn-out position. In this way the rod stroke to the maximally drawn-out position is automatically adjusted depending upon the longitudinal extension of the vulcanization chamber 5 in its maximally extended position, without being however necessary, unlike the known art, to modify the positioning of the upper disc 6 along the end portion of the drive rod 7 and/or replace the locating collars within the fluid-operated actuator 8. In particular, in the device in question the upper disc 6 exhibits a fixed predetermined positioning, at the upper end 7b of the drive rod 7.

Still in accordance with the invention the fluid-operated actuator 8, for the purpose of carrying out the shifting of the lower piston 11 and, as a result, of the drive rod 7, is provided to be fed with working fluid, conveniently water or steam, under a pressure included between 0.4 and 1.2 MPa. This expedient makes it possible to install the device in question on already existing presses of the B.O.M. type, by reducing therein the feed pressure of the fluid-operated actuator 8 so as to eliminate any risk of damages to the vulcanization chamber 5 by effect of the thrust exerted by the drive rod 7 in its maximally drawn-out position.

Figure 5:
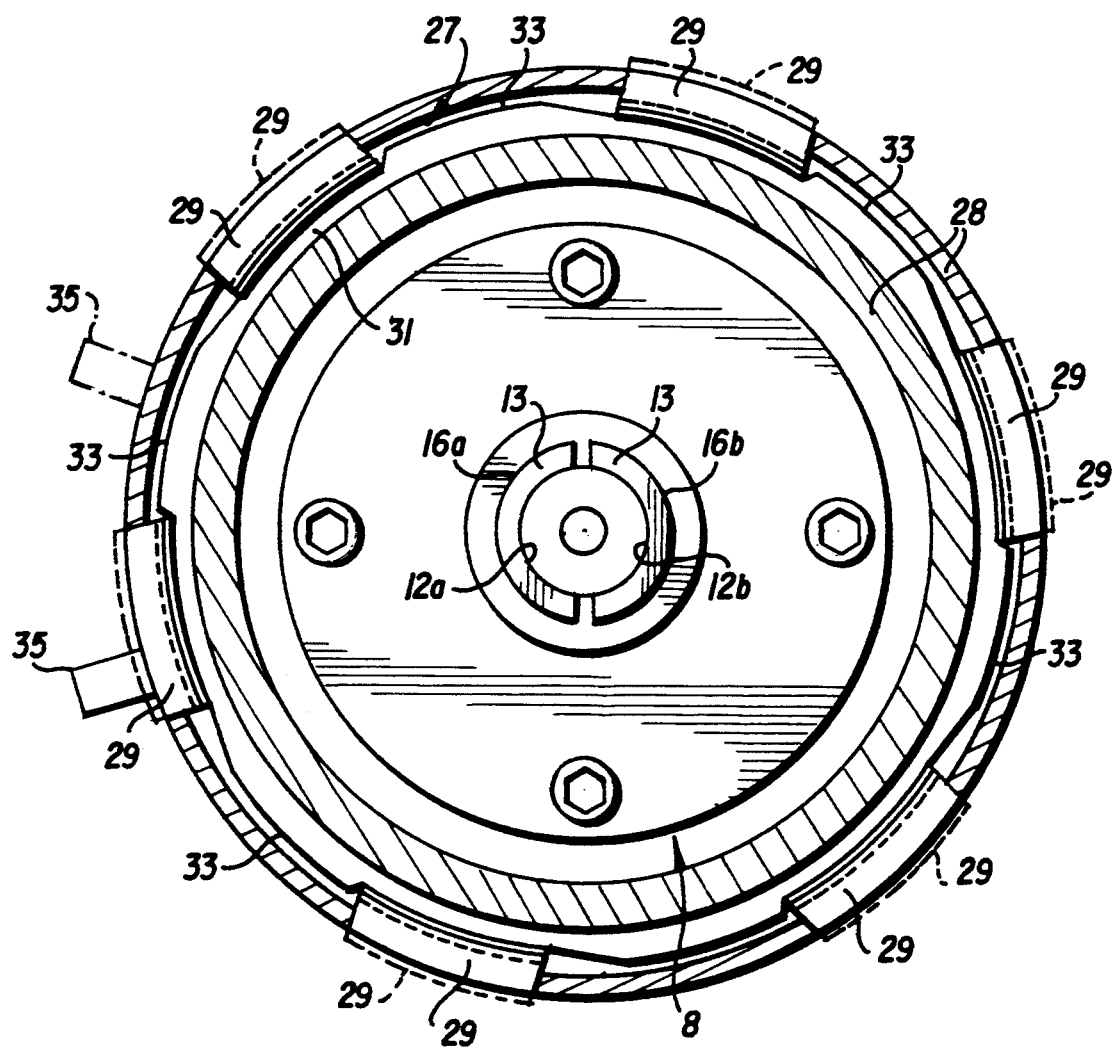

The second stop means in turn comprises a pair of semi-cylindrical elements 12a, 12b to be moved close to the drive rod 7 at opposite positions, as shown in FIG. 5, in order to define a tubular locating sleeve 13 slidably passed through by the drive rod.

This locating sleeve 13 has a lower end 13a arranged to act in abutment on a locating seat 14 carried by the fluid-operated actuator 8, as well as an upper end 13b adapted to offer an abutment seat to stop the downstroke of the drive rod 7 to the minimally drawn-out position.

In particular the locating seat 14 is advantageously formed on an upper piston 15 operatively housed in the actuator 8, at a position overlying the lower piston 11 and slidably passed through by the drive rod 7. This expedient too makes it possible to install the device 1 on already existing presses of the B.O.M. type, the fluid-operated actuator of which is provided with an upper piston similar to the one shown in the accompanying drawings.

Advantageously, the semi-cylindrical elements 12a, 12b forming the locating sleeve 13 can be easily withdrawn from the fluid-operated actuator 8 so as to be replaced in turn with semi-cylindrical elements of different length, depending upon the axial distance to be given to the movable disc 6 relative to the fixed disc 9 in the minimally drawn-out position of the drive rod 7.

Figure 4:
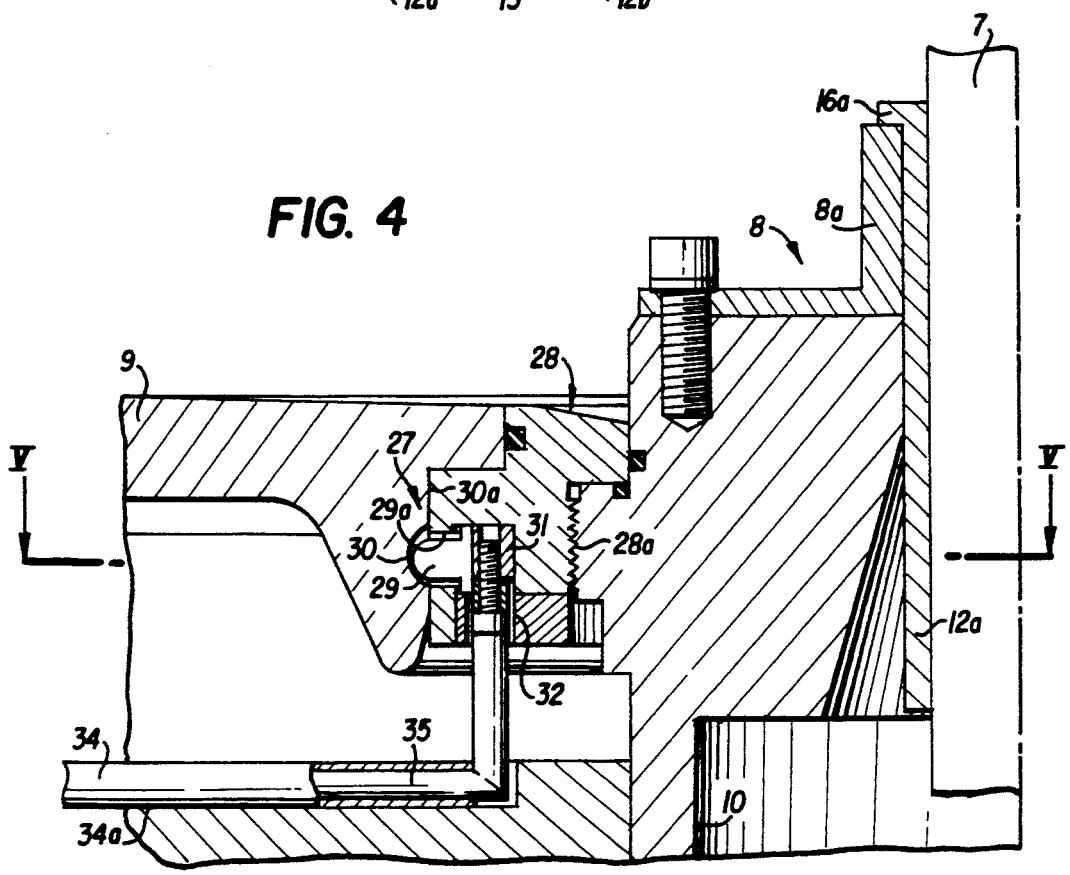
FIG. 4 is a fragmentary diametrical half-sectional view of a detail of a grasping ring; and, FIG. 5 is a cross-sectional view of the grasping ring taken along line V—V in FIG. 4.

Each semi-cylindrical element 12a, 12b is also provided, in the vicinity of its upper end, with at least a radial retaining relief 16a, 16b arranged to act in abutment, as shown in FIG. 4, on the upper end of a collar 8a conveniently fastened to the upper end of the fluid-operated actuator 8, for stopping the locating sleeve 13 sliding towards the inside of the actuator, should the upper piston 15 during the conventional operating cycle of the vulcanization press move away from the upper end of the actuator to a greater extent than the sleeve 13 length.

Advantageously, also provided in the collar body is a retaining device of any known type and therefore not shown (for example an elastic clip to be engaged into a groove formed in the body of each of the semi-cylindrical elements) preventing said elements from accidentally sliding off from said collar.

Still in accordance with the present invention, the movable disc 6 is provided to be fastened to the drive rod 7 by a grasping head 17 fastened to the upper end 7a of the rod and arranged to be removably engaged, by quick coupling means 18 with a cylindrical collar 19 coaxially fastened to the movable disc.

Figure 3:
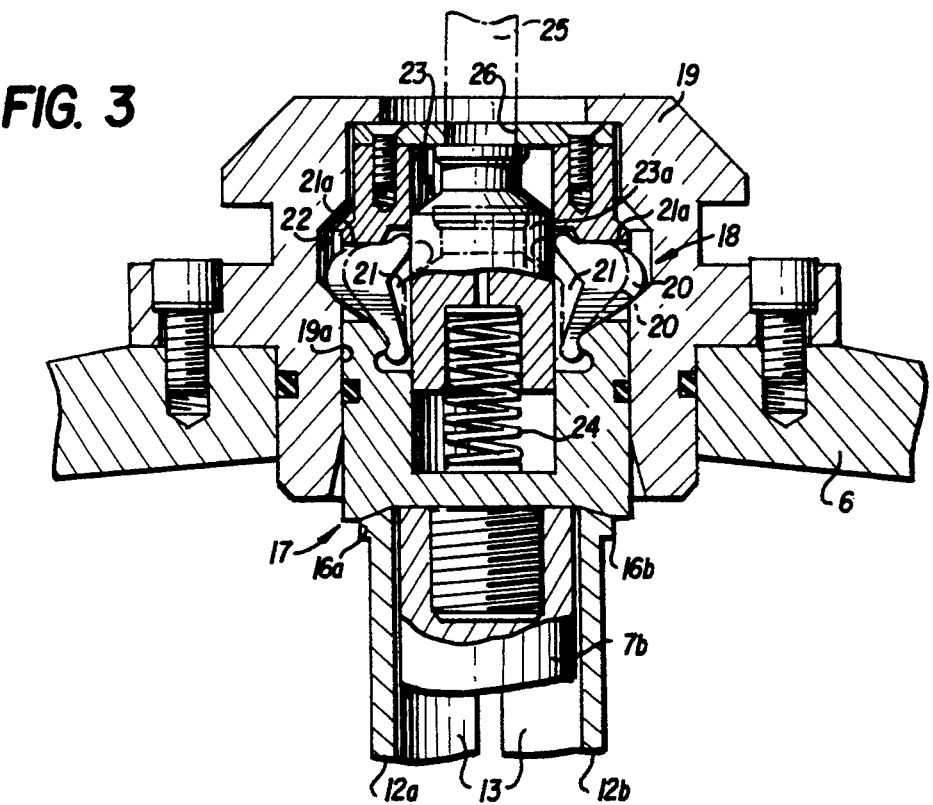
FIG. 3 is a diametrical sectional view of a detail of a grasping head provided in the device in question.

Referring particularly to FIG. 3, the first coupling means 18 comprises a plurality of pins 20 oscillatably received in respective housings circumferentially distributed in the grasping head 17. Pins 20 are simultaneously oscillating between an engagement position in which they radially project from respective openings 21a exhibited by the grasping head 17 to hold the movable disc 6 at an annular groove 22 formed on an inner cylindrical surface 19a of the cylindrical collar 19, and a disengagement position in which they are radially retracted within the grasping head 17 for enabling the free movement of the movable disc 6 relative to the rod 7.

The shifting of pins 20 between the engagement and disengagement positions takes place by means of a driving bush 23 coaxially movable within the grasping head 17, between a retaining position in which, by an outer cylindrical surface 23a thereof, it acts on the pins 20 in order to keep them in the engaged position, and a release position in which, as shown by phantom line in FIG. 3, it releases the pins 20 in order to make their shifting to the disengaged position free.

In particular, the displacement of the driving bush 23 from the retaining position to the release position takes place against the action of a return spring 24 operating between the grasping head 17 and the bush by means of a thrust element 25 shown in dotted line, to be inserted in an access opening 26 exhibited by the grasping head at the upper part thereof. The thrust element 25 can consist of a manual tool or an element belonging to an automated transport device of the vulcanization chambers 5, in the same manner as described in the above mentioned U.S. Patent in the name of the same Applicant.

The fastening of the lower disc 9 to the upper end of actuator 8 takes place, still in accordance with the present invention, by second quick coupling means 27 associated with a grasping ring 28 which, as clearly shown in FIG. 4, is fastened to the actuator in the vicinity of the upper end thereof by a threaded coupling 28a.

More particularly, the fastening of the grasping ring 28 takes place by utilizing as the threaded coupling 28a, the thread already present in conventional B.O.M. presses for locking the lower disc to the upper end of the fluid-operated actuator 8.

Referring particularly to FIGS. 4 and 5, the second quick coupling means 27 comprises a plurality of latches 29 housed in respective slide openings 29a circumferentially distributed in the grasping ring 28. Latches 29 are simultaneously movable between an engaged position in which, as shown by dotted line in FIG. 5, they project from the slide openings 29a radially towards the outside of the grasping ring 28, to a disengaged position in which they are radially retracted towards the ring inside. In the engaged position latches 29 engage the fixed disc, as shown in FIG. 4, at an annular groove 30 formed in an inner cylindrical surface 30a of the disc itself, whereas in the disengaged position said latches release the shifting of the fixed disc 9 from the grasping ring 28 and therefore from the vulcanization press as a whole.

The latches shifting from the engaged position to the disengaged position occurs by means of a driving nut 31 rotatably housed in an annular cavity 32 formed coaxially in the grasping ring 28. Provided on an outer circumferential edge of the drive nut 31 is a plurality of circumferential cams 32 each associated with one of the latches 29.

The driving nut 31 is susceptible of angular rotation between a retaining position in which the cams 32 keep the latches 29 in the engaged position, to a release position in which said cams disengage the respective latches 29 so as to enable the free shifting of the same to the disengaged position, which will occur as soon as the fixed disc 9 is removed from the grasping ring 28.

In the embodiment shown the angular rotation of the nut 31 is manually controlled by a bar 34 (FIG. 4) to be for example inserted in a cavity 34a formed frontally in the press bed 2, which is accessible only when the actuator has been raised from said bed and engages with an operating lever 35 fastened to the ring in cantilevered fashion.

Obviously it is also possible to operate the angular displacement of the ring 31 in an automated manner, by means of electric motors, fluid-operated actuators or equivalent means.

The control of the vulcanization chamber 5 by means of the device in question described above mainly as regards structure is as follows.

When the vulcanization chamber 5 together with the fixed 6 and movable 9 discs is installed under operating conditions on the vulcanization press, its movement takes place concurrently with the traditional vulcanization cycle of tires 4, by means of a new control process according to which the movable disc 6 is first moved away from the fixed disc 9 by introducing working fluid at a pressure included between 0.4 and 1.2 MPa into the space under the lower piston 11. In this way the extension of the vulcanization chamber is caused according to a substantially cylindrical conformation, as shown in FIG. 1.

According to the invention, as previously discussed, the moving away of the movable disc 6 from the fixed disc 9 terminates as soon as a longitudinal tensioning of the vulcanization chamber 5 occurs, which is sufficient to counteract the thrust transmitted to the movable disc upon command of the fluid-operated actuator 8.

When the chamber 5 is in the extended condition, the removal of the previously vulcanized tire 4 and the introduction of a new tire 4 to be vulcanized is optionally carried out in the lower half portion 3a of the press mold 3.

At this point, concurrently with the mold closure following the mutual approaching of the half portions 3a, 3b forming it, the movable disc 6 is moved close to the fixed disc 9, still upon command of the actuator 8.

In greater detail, this approaching step is caused by admitting working fluid between the lower piston 11 and upper piston 15. Under this situation, while the lower piston 11 is moving downwardly within the actuator 8 thereby causing the lowering of the movable disc 6, the upper piston 15 is urged upwardly as far as it stops against the upper end of the actuator 8, so as to give the upper end of the tubular locating sleeve 13 a predetermined positioning depending on the longitudinal extension of the semi-cylindrical elements 12a, 12b. This positioning will determine the stop position of the movable disc 6 when the drive rod 7 is in the minimally drawn-out position relative to actuator 8, so that the fixed and movable discs 9 and 6 are located at the desired distance between centers depending upon the geometrical features of the tire 4 being worked on.

The lowering of the movable disc 6 takes place concurrently with the admission of a working fluid, generally steam under pressure, into the vulcanization chamber 5, so as to cause the radial expansion thereof within the closed mold 3. Pressure exerted within the tire 4 following the radial expansion of the vulcanization chamber 5 ensures perfect adhering of the tire 4 to the inner mold walls during the whole vulcanization step.

When the vulcanization operation is over, the mold 3 is opened and the vulcanization chamber 5 is brought back to the extended condition by moving the movable disc 6 away from the fixed disc 9, concurrently with the withdrawal from the chamber of the previously introduced steam.

Advantageously, when the replacement of the vulcanization chamber 5 is required, for example because a vulcanization chamber having a greater axial extension is needed, it is sufficient to act on the first and second quick coupling means 18, 27 in order to enable the movable and fixed discs 6 and 9 to be disengaged together with the chamber 5 associated therewith.

As previously said, it is possible to act on the first and second quick coupling means 18, 27 and to subsequently remove the discs 6 and 9 and the associated chamber 5 when the press is still hot, without carrying out manual interventions, with the aid of automated picking up means, of the type described in the above mentioned U.S. Pat. No. 4,872,822.

After removing the chamber 5 it will be possible to remove the semi-cylindrical elements 12a, 12b by merely withdrawing them from the actuator 8, after unlocking said retaining device, so as to replace them with other semi-cylindrical elements of different length, adapted to the new type of chamber to be installed on the press.

The installation of the new chamber will take place by merely engaging the respective movable 6 and fixed discs 9 to the first and second quick coupling means 18, 27 disposed in the grasping head 17 and grasping ring 28.

The invention achieves important advantages.

In fact, the possibility of carrying out the replacement of chambers 5 in a very quick and easy manner without involving high idle times as usually happens when traditional presses of the B.O.M. type are used, leads to important advantages under the economical point of view. In this connection attention is drawn to the fact that not only the replacement of the chamber is carried out much quicker than in conventional B.O.M. presses, but in addition there is no waste of time and energy, which on the contrary happens in the known art for causing the cooling and subsequent heating of the vulcanization press.

It is also pointed out that the invention lends itself to be advantageously carried into effect on presses of the B.O.M. type already in existence by accomplishing simple modifications and adaptations to the operating cycle.

Obviously, many modifications and variations can be made to the invention as conceived, all of them falling within the scope of the inventive idea.

I claim:

1. A control device for extending a flexible substantially sleeve-shaped vulcanization chamber in a tire vulcanization press from an axially-expanded condition to a radially expanded condition and vice versa, comprising:

a fluid-operated actuator housed in a vulcanization press bed;

an elongated drive rod coaxially projecting from said fluid-operated actuator and mounted for movement in the direction of its longitudinal axis;

a lower piston housed in the actuator for moving said drive rod from a minimally drawn-out position to a maximally drawn-out position relative to said actuator;

a movable disc detachably mounted to a distal end of the drive rod and sealingly secured to an upper end edge of said vulcanization chamber;

a fixed disc, detachably mounted to the fluid-operated actuator and sealingly secured to a lower end edge of said vulcanization chamber;

first stop means to limit the positioning of the drive rod to the maximally drawn-out position;

second stop means to limit the positioning of the drive rod to the minimally drawn-out position;

a grasping head carried by said distal end of the drive rod and having first quick coupling means for detachably engaging the movable disc to the rod;

a grasping ring carried by said fluid-operated actuator and having second quick coupling means for detachably engaging said fixed disc;

said first stop means comprising said sleeve-shaped vulcanization chamber, the wall thereof reacting to tensile stress between the movable and fixed sealing discs so as to stop the movement of the drive rod at the maximally drawn-out position;

said second stop means comprising at least two semi-cylindrical elements positioned adjacent the drive rod at opposite sides thereof, so as to define a tubular locating sleeve which is slidably passed through by the drive rod, said locating sleeve having a lower end abutting a locating seat carried by the fluid-operated actuator and an upper end acting as an abutment seat for limiting a drive rod retraction stroke to said minimally drawn-out position.

2. A device according to claim 1 in which said first quick coupling means comprises:

a cylindrical collar coaxially secured to the movable disc with means for engaging said grasping head;

said means for engaging comprising a plurality of pins oscillatably mounted in a plurality of respective circumferentially-spaced housings in the grasping head;

said pins being mounted for oscillating between an engaged position in which said pins radially project from openings in the grasping head for holding the movable disc at an annular groove formed within said collar, and a disengaged position in which said pins are radially retracted within the head so as to enable said movable disc to be removed from said drive rod;

a drive bush coaxially movable within the grasping head between a retaining position in which it acts on the pins to keep them to the engaged position, and a release position in which it frees said pins to enable the movement thereof to the disengaged position.

3. A device according to claim 2 including a return spring biasing said drive bush from the retaining position to the release position and a thrust element in an access opening at an upper part of said grasping head for controlling said return spring.

4. A device according to claim 1 in which said grasping ring is fastened to the fluid-operated actuator by a threaded coupling.

5. A device according to claim 1 in which said second quick coupling means comprises:

a plurality of latches housed in respective slide openings which are circumferentially spaced in the grasping ring, said latches being movable between an engaged position, in which they radially project from said slide openings for engagement in an annular groove formed in an inner cylindrical surface of said fixed disc and a disengaged position in which said latches are radially inwardly retracted for releasing the fixed disc;

a drive nut rotatably housed in an annular recess in the grasping ring and carrying, on an outer peripheral edge thereof, a plurality of circumferential cams, each said cam being associated with one of said latches, said drive nut being angularly rotatable between a retaining position in which said cams keep the latches in the engaged position and a release position in which the cams disengage the respective latches to enable free movement thereof to the disengaged position.

6. A device according to claim 1 in which said locating seat is formed on an upper piston slidably housed in the fluid-operated actuator and slidably passed through by said drive rod.

7. A device according to claim 6 in which each of said semi-cylindrical elements is provided, in the vicinity of an upper end thereof, with a shoulder arranged to abut the upper end of the fluid-operated actuator for stopping the locating sleeve from sliding towards the actuator when the upper piston moves away from the upper end of the actuator itself.

8. A process for controlling the extension of a flexible substantially sleeve-shaped vulcanization chamber in a tire vulcanization press, said vulcanization chamber having an upper end edge engaged to a movable disc mounted on a drive rod and axially movable upon command of a fluid-operated actuator fastened to a vulcanization press bed, and a lower end edge engaged with a fixed disc which is fixed relative to said fluid-operated actuator, said process comprising the steps of:

moving the movable disc apart from the fixed disc upon action exerted by said fluid-operated actuator on said drive rod, so as to extend the vulcanization chamber to a substantially cylindrical conformation with the extension of the chamber acting as a first stop means;

stopping the movement of the movable disc away from the fixed disc when the longitudinal tensioning of the vulcanization chamber counteracts the thrust transmitted to the movable disc by said fluid-operated actuator;

moving the movable disc close to the fixed disc until in abutment with second stop means and simultaneously introducing a working fluid into the vulcanization chamber to cause the chamber to radially expand within a mold of said press; said second stop means comprising at least two semi-cylindrical elements positioned adjacent the drive rod at opposite sides thereof, so as to define a tubular locating sleeve which is slidably passed through by the drive rod, said locating sleeve having a lower end abutting a locating seat carried by the fluid-operated actuator and an upper end acting as an abutment seat for limiting a drive rod retraction stroke to a minimally drawn-out position.

9. A process according to claim 8 in which the step of moving said movable disc apart from said fixed disc comprises the feeding of a working fluid to operate the actuator under a pressure between 0.4 and 1.2 MPa.

* * * * *